(12) United States Patent
Umemura et al.

(10) Patent No.: US 8,394,865 B2
(45) Date of Patent: Mar. 12, 2013

(54) ION-EXCHANGE MEMBRANE FOR ALKALINE CHLORIDE ELECTROLYSIS

(75) Inventors: Kazuo Umemura, Chiyoda-ku (JP);
Hiromitsu Kusano, Chiyoda-ku (JP);
Tetsuji Shimohira, Chiyoda-ku (JP);
Susumu Saito, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 803 days.

(21) Appl. No.: 12/503,941

(22) Filed: Jul. 16, 2009

(65) Prior Publication Data
US 2009/0306233 A1    Dec. 10, 2009

Related U.S. Application Data

(63) Continuation of application No. PCT/JP2008/050825, filed on Jan. 22, 2008.

(30) Foreign Application Priority Data

Jan. 31, 2007    (JP) ................ 2007-020936

(51) Int. Cl.
*C08J 5/20* (2006.01)
*H01M 8/10* (2006.01)

(52) U.S. Cl. ............... 521/27; 429/492; 429/494

(58) Field of Classification Search .......... 521/27; 429/492, 494
See application file for complete search history.

(56) References Cited

U.S. PATENT DOCUMENTS

| | | | | |
|---|---|---|---|---|
| 5,716,504 | A * | 2/1998 | Saito et al. ............... | 204/296 |
| 8,017,257 | B2 * | 9/2011 | Shimohira et al. ......... | 429/494 |
| 8,097,383 | B2 * | 1/2012 | Kaneko et al. ............ | 429/492 |
| 2002/0160272 | A1 | 10/2002 | Tanaka et al. | |
| 2007/0161718 | A1 | 7/2007 | Umemura et al. | |
| 2008/0166601 | A1 * | 7/2008 | Honmura et al. ........... | 429/13 |

FOREIGN PATENT DOCUMENTS

| | | | |
|---|---|---|---|
| EP | 1 916 237 A1 | | 4/2008 |
| EP | 1914824 A1 | * | 4/2008 |
| EP | 1 927 601 A1 | | 6/2008 |
| EP | 1927601 A1 | * | 6/2008 |
| EP | 2 107 073 A1 | | 10/2009 |
| EP | 2107073 A1 | * | 10/2009 |
| JP | 64-29440 | | 1/1989 |
| JP | 02-056252 | | 2/1990 |
| JP | 02-088645 | | 3/1990 |
| JP | 06-033281 | | 2/1994 |
| JP | 09-78280 | | 3/1997 |
| JP | 11-49877 | | 2/1999 |
| JP | 2002-249604 | | 9/2002 |
| JP | 2002-275672 | | 9/2002 |
| JP | 2002-324559 | | 11/2002 |
| JP | 2002-348389 | | 12/2002 |
| WO | WO 2007/013533 A1 | | 2/2007 |
| WO | WO 2007013533 A1 | * | 2/2007 |

OTHER PUBLICATIONS

U.S. Appl. No. 13/193,197, filed Jul. 28, 2011, Umemura, et al.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

To provide an ion exchange membrane for alkaline chloride electrolysis having a low electric resistance and further having a sufficient mechanical strength.

To employ an ion exchange membrane containing a polymer having units (U1).

$$-CF_2-CF- \quad\quad Q^1-SO_2X^1(SO_2R^{f1})_aM \atop |\phantom{xxx} \diagup \atop (CF_2)_rOCF_2-CY^1 \atop \phantom{xxx}\diagdown \atop Q^2-SO_2X^1(SO_2R^{f1})_aM$$ (U1)

$Q^1$, $Q^2$ = a perfluoroalkylene group or the like; $R^{f1}$, $R^{f2}$ = a perfluoroalkyl group or the like; $X^1$ = an oxygen atom or the like; $a=0$ or the like; $Y^1$ = a fluorine atom or the like; $r=0$ or 1; and M = a hydrogen atom or an alkali metal atom.

11 Claims, No Drawings

ION-EXCHANGE MEMBRANE FOR ALKALINE CHLORIDE ELECTROLYSIS

TECHNICAL FIELD

The present invention relates to an ion exchange membrane for alkaline chloride electrolysis.

BACKGROUND ART

An alkaline chloride electrolytic process employing an ion exchange membrane method, which comprises electrolyzing an aqueous alkaline chloride solution using an ion exchange membrane as a diaphragm to produce an alkali hydroxide and chlorine, has been known.

As an ion exchange membrane, usually, a membrane made of a polymer having sulfonic acid groups or a laminate having a layer made of a polymer having sulfonic acid groups is used. As the polymer, the following polymer is used for the general purpose.

(1) A polymer obtained by subjecting a copolymer of the compound represented by the following formula (1) with tetrafluoroethylene to hydrolysis to convert —$SO_2F$ groups to sulfonic acid groups (—$SO_3M$ groups) (Patent Document 1).

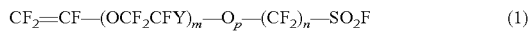

$$CF_2=CF-(OCF_2CFY)_m-O_p-(CF_2)_n-SO_2F \quad (1)$$

wherein M is a hydrogen atom or an alkali metal, Y is a fluorine atom or a trifluoromethyl group, m is an integer of from 0 to 3, n is an integer of from 1 to 12, and p is 0 or 1, provided that m+p>0.

An ion exchange membrane has been desired to produce an alkali hydroxide and chlorine at a small electric power for electrolysis (low electrolysis voltage). Accordingly, as a polymer to be used for an ion exchange membrane, a polymer having a low electrical resistance i.e. a low equivalent weight has been desired. In order to reduce the equivalent weight of the polymer (1), the amount of sulfonic acid groups, namely, the proportion of the compound represented by the formula (1), may be increased.

However, if the proportion of the compound represented by the formula (1) is increased, it tends to be difficult to sufficiently increase the molecular weight of the polymer, and further, the polymer will be excessively swollen with water, whereby the mechanical strength of the ion exchange membrane will be insufficient.

Patent Document 1: JP-A-6-33281

DISCLOSURE OF THE INVENTION

Object to be Accomplished by the Invention

It is an object of the present invention to provide an ion exchange membrane for alkaline chloride electrolysis having a low electrical resistance and further having a sufficient mechanical strength.

Means to Accomplish the Object

The ion exchange membrane for alkaline chloride electrolysis of the present invention is an ion exchange membrane for alkaline chloride electrolysis, comprising a polymer having ionic groups, wherein said polymer has repeating units represented by the following formula (U1):

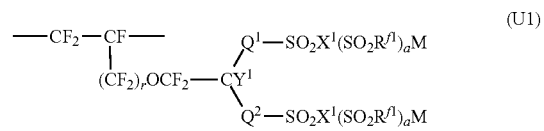

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, or 2 when $X^1$ is a carbon atom, $Y^1$ is a fluorine atom or a monovalent perfluoroorganic group, r is 0 or 1, and M is a hydrogen atom or an alkali metal.

It is preferred that said polymer further has repeating units based on tetrafluoroethylene.

It is preferred that said polymer further has repeating units represented by the following formula (U2) or repeating units represented by the following formula (U3).

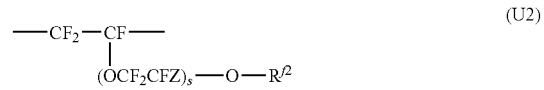

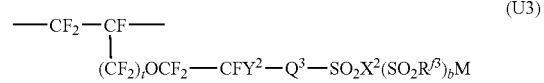

wherein $R^{f2}$ is a perfluoroalkyl group, Z is a fluorine atom or a monovalent perfluoroorganic group, s is an integer of from 0 to 3, $Q^3$ is a single bond or a perfluoroalkylene group which may have an etheric oxygen atom, $R^{f3}$ is a perfluoroalkyl group, $X^2$ is an oxygen atom, a nitrogen atom or a carbon atom, b is 0 when $X^2$ is an oxygen atom, 1 when $X^2$ is a nitrogen atom, or 2 when $X^2$ is a carbon atom, $Y^2$ is a fluorine atom or a monovalent perfluoroorganic group, t is 0 or 1, and M is a hydrogen atom or an alkali metal.

It is preferred that said polymer has an equivalent weight of from 600 to 1100 g/equivalent when the above M is a hydrogen atom.

The ion exchange membrane for alkaline chloride electrolysis of the present invention may be a laminate having a layer containing said polymer and a layer containing a polymer having carboxylic acid groups.

Effect of the Invention

The ion exchange membrane for alkaline chloride electrolysis of the present invention has a low electrical resistance and further has a sufficient mechanical strength.

BEST MODE FOR CARRYING OUT THE INVENTION

In the present specification, repeating units represented by the formula (U1) will be referred to as units (U1). The same applies to repeating units represented by other formulae. The repeating units are units derived from a monomer and formed by polymerization of the monomer. The repeating units may be units formed directly by the polymerization reaction or may be units having part of the units converted to another structure by treating the polymer.

Further, in the present specification, a compound represented by the formula (u1) will be referred to as compound (u1). The same applies to compounds represented by other formulae.

(Ion Exchange Membrane)

The ion exchange membrane for alkaline chloride electrolysis of the present invention (hereinafter referred to as "the present ion exchange membrane") is a membrane containing a polymer having ionic groups. The ionic groups may, for example, be sulfonic acid groups, sulfone imide groups, sulfone methide groups, or carbonic acid groups. Such ionic groups may be in an acid form or a salt form.

(Polymer N)

The present ion exchange membrane contains a polymer (hereinafter referred to as "a polymer N") having units (U1) as a polymer having ionic groups:

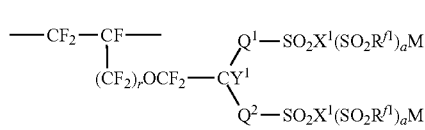
(U1)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, "a" is 0 when $X^1$ is an oxygen atom, 1 when $X^1$ is a nitrogen atom, or 2 when $X^1$ is a carbon atom, $Y^1$ is a fluorine atom or a monovalent perfluoroorganic group, r is 0 or 1, and M is a hydrogen atom or an alkali metal.

The single bond means a bond that the carbon atom of $CY^1$ and the sulfone atom of $SO_2$ are directly bonded to each other.

The organic group means a group containing at least one carbon atom.

Unit (U1):

In a case where the perfluoroalkylene group as each of $Q^1$ and $Q^2$ has an etheric oxygen atom, the number of such an oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched, and is preferably linear.

The number of carbon atoms in the perfluoroalkylene group is preferably from 1 to 6, more preferably from 1 to 4. If the number of carbon atoms is at most 6, the boiling point of the raw material fluoromonomer will be low, and purification by distillation will easily be carried out. Further, when the number of carbon atoms is at most 6, the increase in the equivalent weight of the polymer N will be suppressed, whereby it is possible to suppress the increase in the resistance of the present ion exchange membrane.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability in electrolysis performance will be achieved when the electrolytic cell is operated over a long period of time as compared with a case where $Q^2$ is a single bond.

At least one of $Q^1$ and $Q^2$ is preferably a $C_{1-6}$ perfluoroalkylene group having an etheric oxygen atom. A fluoromonomer having the $C_{1-6}$ perfluoroalkylene group having an etheric oxygen atom can be prepared without fluorination reaction with a fluorine gas, and accordingly its production is easy with high yield.

The perfluoroalkyl group as $R^{f1}$ may be linear or branched, and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

In a case where the unit (U1) has at least two $R^{f1}$'s, such $R^{f1}$'s may be the same groups or different groups.

The $-(SO_2X^1(SO_2R^{f1})a)M$ group is an ionic group.

The $-(SO_2X^1(SO_2R^{f1})a)M$ group may be a sulfonic acid group (a $-SO_3M$ group), a sulfone imide group ($-SO_2N(SO_2R^{f1})M$ group) or a sulfone methide group ($-SO_2C(SO_2R^{f1})_2)M$ group).

$Y^1$ is preferably a fluorine atom or a $C_{1-6}$ linear perfluoroalkyl group which may have an etheric oxygen atom.

The units (U1) are preferably units (M1), more preferably units (M11), units (M12) or units (M13) in view of easy preparation of the polymer N and easy industrial application:

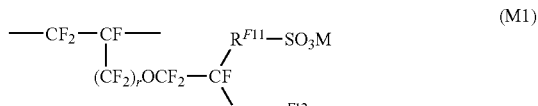
(M1)

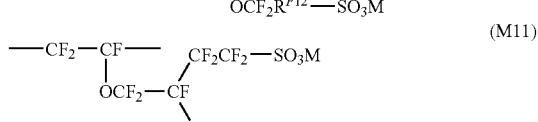
(M11)

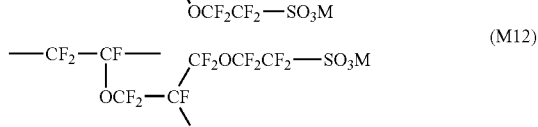
(M12)

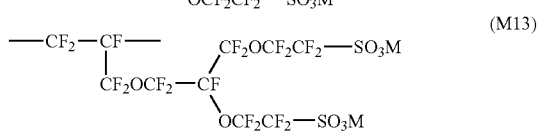
(M13)

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

The polymer N may further have units (U2) or units (U3):

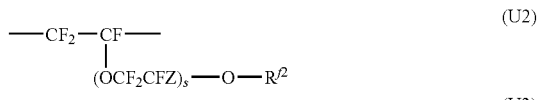
(U2)

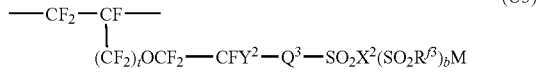
(U3)

wherein $R^{f2}$ is a perfluoroalkyl group, Z is a fluorine atom or a monovalent perfluoroorganic group, s is an integer of from 0 to 3, $Q^3$ is a single bond or a perfluoroalkylene group which may have an etheric oxygen atom, $R^{13}$ is a perfluoroalkyl group, $X^2$ is an oxygen atom, a nitrogen atom or a carbon atom, b is 0 when $X^2$ is an oxygen atom, 1 when $X^2$ is a nitrogen atom, or 2 when $X^2$ is a carbon atom, $Y^2$ is a fluorine atom or a monovalent perfluoroorganic group, t is 0 or 1, M is a hydrogen atom or an alkali metal.

Unit (U2):

The perfluoroalkyl group as $R^{f2}$ may be linear or branched. The number of carbon atoms in the perfluoroalkyl group is preferably from 1 to 12. When the number of carbon atoms is at most 12, the increase in the equivalent weight of the polymer N will be suppressed, whereby it is possible to suppress the increase in the specific resistance of the present ion exchange membrane.

Z is preferably a fluorine atom or a trifluoromethyl group.

The units (U2) are preferably units (M2), more preferably units (M21) or units (M22) in view of easy preparation of the polymer N and easy industrial application:

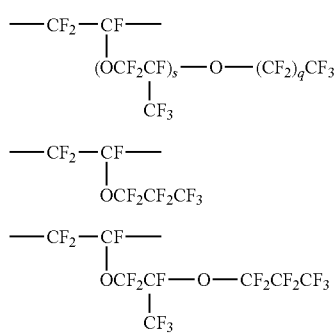

wherein q is an integer of from 1 to 12.

Unit (U3):

When the perfluoroalkylene group as $Q^3$ has an etheric oxygen atom, such an oxygen atom may be one or more. Further, such an oxygen atom may be inserted in the carbon atom-carbon atom bond of the perfluoroalkylene group or may be inserted at the terminal of the carbon atom bond.

The perfluoroalkylene group may be linear or branched.

The number or carbon atoms in the perfluoroalkylene group is preferably from 1 to 6, more preferably from 1 to 4. When the number of carbon atoms is at most 6, the increase in the equivalent weight of the polymer N will be suppressed, and it is possible to suppress the increase in specific resistance of the present ion exchange membrane.

The perfluoroalkyl group as $R^{f3}$ may be linear or branched, but is preferably linear.

The number of carbon atoms of the perfluoroalkyl group is preferably from 1 to 6, more preferably from 1 to 4. The perfluoroalkyl group, is preferably a perfluoromethyl group, a perfluoroethyl group or the like.

The —$(SO_2X^2(SO_2R^{f3})b)M$ group is an ionic group.

The —$(SO_2X^2(SO_2R^{13})b)M$ group may be a sulfonic acid group (a —$SO_3M$ group), a sulfone imide group (a —$SO_2N(SO_2R^{f3})M$ group) or a sulfonemethide group (a —$SO_2C(SO_2R^{13})_2)M$ group).

$Y^2$ is preferably a fluorine atom or a trifluoromethyl group.

The units (U3) are preferably units (M3), more preferably units (M31), units (M32), units (M33) or units (M34) in view of easy preparation of the polymer N and easy industrial application:

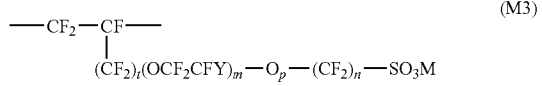

-continued

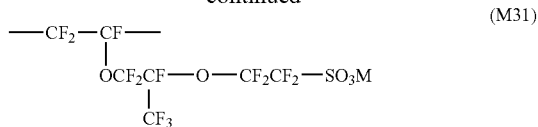

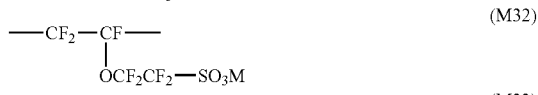

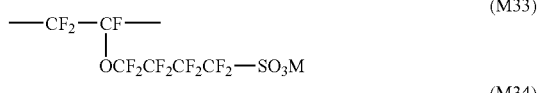

wherein Y is a fluorine atom or a trifluoromethyl group, m is an integer of from 0 to 3, n is an integer of from 1 to 12, p is 0 or 1, provided that m+p>0.

Other Units:

The polymer N may further have repeating units based on another monomer described hereinafter (hereinafter referred to as "other units"). The ratio of other units may properly be adjusted so that the equivalent weight of the polymer N will be within a preferred range described hereinafter.

Such other units are preferably repeating units based on a perfluoromonomer in view of mechanical strength and chemical durability of the present ion exchange membrane, more preferably repeating units based on tetrafluoroethylene (hereinafter referred to as "TFE").

The ratio of the repeating units based on TFE is preferably at least 20 mol %, more preferably at least 40 mol % based on the total repeating units (100 mol %) constituting the polymer N, in view of mechanical strength and chemical durability of the present ion exchange membrane.

The ratio of the repeating units based on TFE is preferably at most 94 mol %, more preferably at most 92.5 mol %, based on the total repeating units (100 mol %) constituting the polymer N.

The polymer N may have one type or more types of each of the unit (U1), the unit (U2), the unit (U3) and the other unit.

The polymer N is preferably a perfluoropolymer from the viewpoint of chemical durability of the present ion exchange membrane.

The equivalent mass (grams of the polymer N per 1 equivalent of ionic groups, hereinafter referred to as EW) of the acid form polymer (the polymer N in which the above M is a hydrogen atom) is preferably from 600 to 1,100 g dry resin/equivalent (hereinafter referred to as g/equivalent), more preferably from 650 to 1,000 g/equivalent, more preferably from 700 to 900 g/equivalent. When EW is at most 1,100 g/equivalent, the electrical resistance of the ion exchange membrane would be low, and therefore, in the case of using it as an ion exchange membrane for alkaline chloride electrolysis, it is possible to obtain a low electrolysis voltage. When EW is at least 600 g/equivalent, it is possible to readily synthesize a polymer having a high molecular weight, and further, the polymer N is not excessively swelled in water, whereby it is possible to maintain the mechanical strength of the present ion exchange membrane.

In the case of the salt form polymer N (polymer N in which the above M is an alkali metal), EW obtained at the time of converting the salt form ionic groups to the acid form ionic groups by acidification treatment as mentioned below, is preferably within the above range.

EW of the polymer generally used heretofore, is considered to be from 900 to 1,100 g/equivalent from the viewpoint of the balance between the electrical resistance and the mechanical strength of the ion exchange membrane. On the other hand, in the case of the polymer N, even when EW is reduced and the electrical resistance of the present ion exchange membrane is lowered, it is possible to maintain the mechanical strength.

The mass average molecular weight of the polymer N is preferably from $1\times10^4$ to $1\times10^7$, more preferably from $5\times10^4$ to $5\times10^6$, further more preferably $1\times10^5$ to $3\times10^6$. When the mass average molecular weight of the polymer N is at least $1\times10^4$, the physical properties such as a swelling ratio hardly changes with time, and the durability of the present ion exchange membrane will be sufficient. When the mass average molecular weight of the polymer N is at most $1\times10^7$, the molding will be easy.

Further, the weight average molecular weight of the polymer N can be evaluated by measuring a TQ value. The TQ value (unit: ° C.) is an index for the molecular weight of a polymer, which is a temperature at which the extrusion amount becomes 100 mm$^3$/sec when melt extrusion of a polymer is carried out under a condition of an extrusion pressure of 2.94 MPa by using a nozzle having a length of 1 mm and an inner diameter of 1 mm. The weight average molecular weight of the polymer having a TQ value of from 200 to 300° C. corresponds to from $1\times10^5$ to $1\times10^6$ though it varies according to the composition of the repeating units constituting the polymer.

Production Process of Polymer N

It is possible to produce the polymer N via e.g. the following steps:

(I) A step of obtaining a precursor polymer (hereinafter referred to as polymer F) having —SO$_2$F groups by polymerizing the compound (u1), and if necessary, the compound (u2), the compound (u3) and the other monomer,

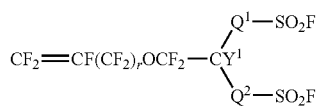

(u1)

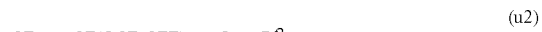

(u2)

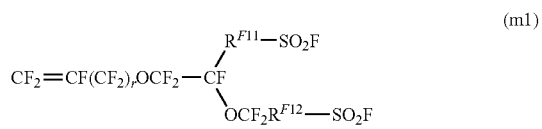

(u3)

(II) a step of bringing the polymer F and a fluorine gas into contact with each other as the case requires to fluorinate unstable terminal groups of the polymer F.

(III) a step of converting —SO$_2$F groups of the polymer F to sulfonic acid groups, sulfoneimide groups or sulfonmethide groups to obtain a polymer N.

Step (I):

As the compound (u1), the compound (m1) is preferred, and the compound (m11), the compound (m12) or the compound (m13) is more preferred.

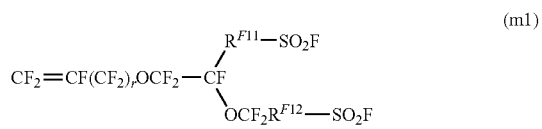

(m1)

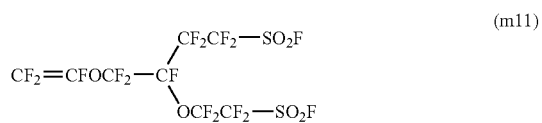

(m11)

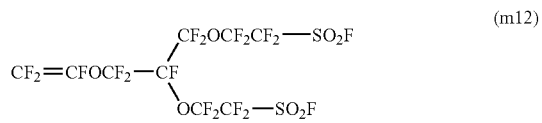

(m12)

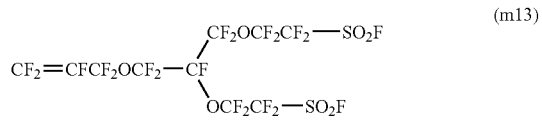

(m13)

Compound (m1) can be prepared, for example, by the following synthesis route:

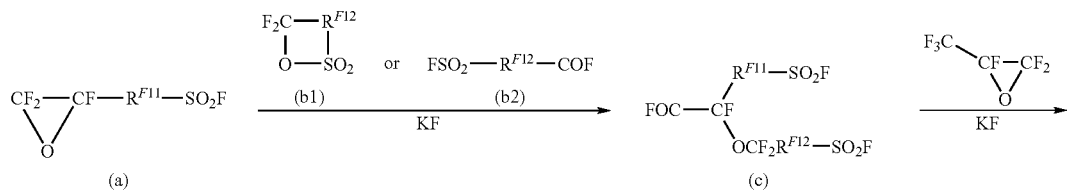

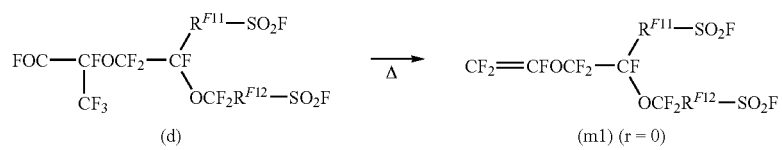

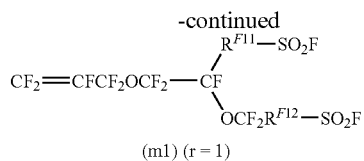

(m1) (r = 1)

As the compound (u2), the compound (m2) is preferred, and the compound (m21) or the compound (m22) is more preferred.

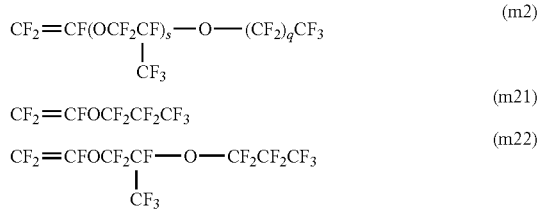

It is possible to produce the compound (u2) by a known preparation process such as a process disclosed in Examples in the specification of U.S. Pat. No. 3,291,843.

The compound (u3) is preferably the compound (m3), more preferably the compound (m31), the compound (m32), the compound (m33) or the compound (m34).

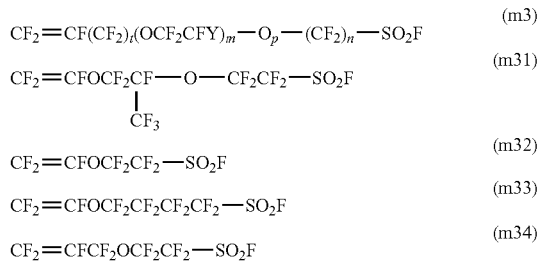

It is possible to produce the compound (u3) by a known preparation method such as a method as disclosed in "Du Pont Innovation", D. J. Vaugham, Vol. 43, No. 3, 1973, p. 10, or a method as disclosed in Examples of U.S. Pat. No. 4,358,412.

The other monomer may, for example, be TFE, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), or a (perfluoroalkyl)propene (such as 3-perfluorooctyl-1-propene).

Among the other monomers, a perfluoromonomer is preferred, TFE is more preferred in view of the mechanical strength and the chemical durability of the present ion exchange membrane.

The polymerization method may be a known polymerization method such as bulk polymerization, solution polymerization, suspension polymerization or emulsion polymerization. Further, the polymerization may be carried out in liquid or supercritical carbon dioxide.

The polymerization is carried out under the conditions which radicals will form. As a method for forming radicals, irradiation with radiation rays such as ultraviolet rays, γ-rays or electron rays, or addition of a radical initiator may, for example, be mentioned.

The polymerization temperature is usually from 10 to 150° C.

The radical initiator may, for example, be a bis(fluoroacyl)peroxide, a bis(chlorofluoroacyl)peroxide, a dialkyl peroxydicarbonate, a diacyl peroxide, a peroxyester, an azo compound or a persulfate, and with a view to obtaining a polymer F having a small number of unstable terminal groups, preferred is a perfluoro compound such as a bis(fluoroacyl) peroxide.

A solvent to be used in the solution polymerization is preferably a solvent having a boiling point of from 20 to 350° C., more preferably a solvent having a boiling point of from 40 to 150° C. The solvent may, for example, be a perfluorotrialkylamine (such as perfluorotributylamine), a perfluorocarbon (such as a perfluorohexane or perfluorooctane), a hydrofluorocarbon (such as 1H,4H-perfluorobutane or 1H-perfluorohexane), or a hydrochlorofluorocarbon (such as 3,3-dichloro-1,1,1,2,2-pentafluoropropane or 1,3-dichloro-1,1,2,2,3-pentafluoropropane).

In the solution polymerization, the monomers, the radical initiator and the like are added to the solvent to form radicals in the solvent thereby to polymerize the monomers. The monomers may be added all at once, may be added sequentially or may be added continuously.

In the suspension polymerization, water is added as a dispersion medium, and the monomers, a nonionic radical initiator and the like are added to the dispersion medium to form radicals in the dispersion medium thereby to polymerize the monomers.

The nonionic radical initiator may, for example, be a bis(fluoroacyl)peroxide, a bis(chlorofluoroacyl)peroxide, a dialkyl peroxydicarbonate, a diacyl peroxide, a peroxyester, a dialkyl peroxide, a bis(fluoroalkyl)peroxide or an azo compound.

To the dispersion medium, the above solvent as an auxiliary agent; a surfactant as a dispersion stabilizer which prevents coagulation of suspended particles; a hydrocarbon compound (such as hexane or methanol) as a molecular weight modifier or the like may be added.

Step (II):

The unstable terminal group is a group formed by chain transfer reaction, or a group derived from the radical initiator, or the like, and specifically, it is a —COOH group, a —CF=CF$_2$ group, a —COF group, a —CF$_2$H group or the like. By fluorinating or stabilizing such unstable terminal groups, decomposition of the polymer N will be suppressed, whereby the durability of the present ion exchange membrane will improve.

The fluorine gas may be used as diluted with inert gas such as nitrogen, helium or carbon dioxide, or it may be used without being diluted.

The temperature at which the polymer F and the fluorine gas are brought into contact with each other is preferably from room temperature to 300° C., more preferably from 50 to 250° C., further more preferably from 100 to 220° C., particularly preferably from 150 to 200° C.

The time over which the polymer F and the fluorine gas are in contact with each other is preferably from one minute to one week, more preferably from 1 to 50 hours.

Step (III):

For example, the Step (III-1) is carried out in a case where the —SO$_2$F groups are converted to sulfonic acid group, and the Step (III-2) is carried out in a case where the —SO$_2$F groups are converted to sulfonimide groups.

(III-1): A step of hydrolyzing the —SO$_2$F groups of the polymer F into salt form sulfonic acid groups, and converting therein to acid form sulfonic acid groups by conversion to an acid form, if necessary.

(III-2): A step of imidizing the —SO$_2$F groups of the polymer F into salt-form sulfoneimide groups (—SO$_2$N(SO$_2$R$^{f1}$)M groups) (wherein M is an alkali metal), and further converting them to acid-form sulfonimide groups (—SO$_2$N(SO$_2$R$^{f1}$)H groups) if necessary.

Step (III-1):

The hydrolysis is carried out, for example, by contacting the polymer F and a basic compound into contact with each other in a solvent.

The basic compound may, for example, be sodium hydroxide or potassium hydroxide. The solvent may, for example, be water or a solvent mixture of water and a polar solvent. The polar solvent may, for example, be an alcohol (such as methanol or ethanol) or dimethyl sulfoxide.

The conversion to an acid form is carried out, for example, by bringing the polymer having salt-form sulfonic acid groups with an aqueous solution of e.g. hydrochloric acid or a sulfonic acid.

The hydrolysis and the conversion to an acid form are carried out usually at a temperature of from 0 to 120° C.

Step (III-2):

As the imidization, the following method may be mentioned.

(III-2-1) A method of reacting the —SO$_2$F group with R$^{f1}$SO$_2$NHM.

(III-2-2) A method of reacting the —SO$_2$F group with R$^{f1}$SO$_2$NH$_2$ in the presence of an alkali metal hydroxide, an alkali metal carbonate or MF.

(III-2-3) A method of reacting the —SO$_2$F group with R$^{f1}$SO$_2$NMSi(CH$_3$)$_3$.

(Laminate)

The present ion exchange membrane may be a laminate having a layer (hereinafter referred to as "layer A") containing the polymer N and a layer (hereinafter referred to as "layer B") containing a polymer (hereinafter referred to as "polymer H") having a carboxylic acid group.

For example, the polymer H is obtainable by hydrolyzing a precursor polymer (hereinafter referred to as polymer G) having a precursor group of a carboxylic acid group thereby to convert the precursor group for the carboxylic acid group to the carboxylic acid group.

As the polymer G, a copolymer of at least one of the compound (2) with at least one of the compound (3) or the compound (4) is mentioned.

$$CF_2=CX^{21}X^{22} \quad (2)$$

$$CF_2=CF(OCF_2CFX^{31})_vO(CF_2)_w\text{-A} \quad (3)$$

$$CF_2=CFO(CF_2)_xO(CF_2)_y\text{-A} \quad (4)$$

wherein X$^{21}$ and X$^{22}$ are a fluorine atom, a chlorine atom, a hydrogen atom or a trifluoromethyl group, respectively, X$^{31}$ is a fluorine atom or a trifluoromethyl group, v is an integer of from 1 to 3, w is an integer of from 0 to 2, A is a precursor group to be converted to a carboxylic acid group (—COOM) by hydrolysis in an aqueous alkaline solution, M is a hydrogen atom or an alkali metal, and x+y is an integer of from 4 to 6.

As the compound (2), the compounds (2-1) to (2-5) are preferred.

$$CF_2=CF_2 \quad (2\text{-}1)$$

$$CF_2=CF(CF_3) \quad (2\text{-}2)$$

$$CF_2=CH_2 \quad (2\text{-}3)$$

$$CF_2=CFH \quad (2\text{-}4)$$

$$CF_2=CFCl \quad (2\text{-}5)$$

As the compound (3), the compounds (3-1) to (3-5) are preferred.

$$CF_2=CFOCF_2CF(CF_3)OCF_2CF_2COOR \quad (3\text{-}1)$$

$$CF_2=CFOCF_2CF_2COOR \quad (3\text{-}2)$$

$$CF_2=CFOCF_2CF(CF_3)OCF_2CF_2CF_2COOR \quad (3\text{-}3)$$

$$CF_2=CFOCF_2CF_2CF_2COOR \quad (3\text{-}4)$$

$$CF_2=CF(OCF_2CF(CF_3))_2OCF_2CF_2COOR \quad (3\text{-}5)$$

wherein R is an alkyl group.

As the compound (4), the compound (4-1) or (4-2) is preferred.

$$CF_2=CFOCF_2CF_2CF_2OCF_2CF_2COOR \quad (4\text{-}1)$$

$$CF_2=CFOCF_2CF_2OCF_2CF_2COOR \quad (4\text{-}2)$$

Wherein R is an alkyl group.

The layer A has a thickness of preferably from 20 to 200 μm, more preferably from 50 to 150 μm. When the thickness of the layer A is at least 20 μm, the mechanical strength will be sufficient, and it is possible to endure a long-term electrolysis. When the thickness of the layer A is at most 200 μm, it is possible to sufficiently lower the electrolysis voltage.

The layer B has a thickness of preferably more than 10 μm and at most 50 μm, more preferably from 15 to 30 μm. When the thickness of the layer B exceeds 10 μm, it is possible to suppress the concentration of alkali chloride in the catholyte permeated from the anode chamber side, and the quality of alkali hydroxide as a product may not be impaired. When the thickness of the layer B is at most 50 μm, the electrical resistance of the ion exchange membrane can be suppressed to be lowered.

(Reinforcing Material)

The present ion exchange membrane may be reinforced by laminating the reinforcing material thereon, as the case requires.

The reinforcing material may, for example, be a woven fabric, a non-woven fabric, fibrils or a porous body.

As a material for the reinforcing material, a fluoropolymer such as polytetrafluoroethylene (hereinafter referred to as "PTFE") is mentioned.

(Production Process of the Present Ion Exchange Membrane)

It is possible to produce the present ion exchange membrane by e.g. the following methods.

Method (a):

(a-1) The polymer F is formed by an extrusion method to obtain a film of the polymer F.

(a-2) As the case requires, the reinforcing material is laminated on the film of the polymer F by e.g. roll pressing.

(a-2) The —SO$_2$F groups of the film of the polymer F are converted to sulfonic acid groups, sulfone imide groups or sulfone methide groups to obtain a film of the polymer N.
Method (b):

(b-1) The polymer F and the polymer G are formed by a coextrusion method to obtain a laminate.

(b-2) As the case requires, the reinforcing material, the film of the polymer F and the like are laminated on the laminate by e.g. roll pressing.

(b-3) The laminate is immersed in an aqueous alkaline solution to convert the —SO$_2$F groups to sulfonic acid groups, and at the same time, the precursor groups for carboxylic acid groups are converted to the carboxylic acid groups, whereby a laminate having the layer A and the layer B is obtained.
Method (c):

(c-1) The polymer F and the polymer G are formed into films, respectively, and then, the film of the polymer F and the film of the polymer G are laminated with each other to obtain a laminate.

(c-2) As the case requires, the reinforcing material, the film of the polymer F and the like are laminated on the laminate by e.g. roll pressing.

(c-3) The laminate is immersed in an alkaline solution to convert the —SO$_2$F groups to the sulfonic acid groups, and at the same time, the precursor groups for carboxylic acid groups are converted to the carboxylic acid groups, whereby a laminate having the layer A and the layer B is obtained.

In order to further improve the long-term stability of the current efficiency of the present ion exchange membrane, it is preferred to conduct treatment for gas release to at least one of the surface of the present ion exchange membrane.

As the treatment method, the following methods are mentioned.

(c-1) A method of applying roughing to the surface of the ion exchange membrane (JP-B-60-26495).

(c-2) A method of supplying a liquid containing an iron compound, zirconium oxide and the like to an electrolytic cell to attach a gas release coating layer containing hydrophilic inorganic particles to the surface of the ion exchange membrane (JP-A-56-152980).

(c-3) A method of providing a porous layer containing a gas and liquid permeable particles having no electrode activity (JP-A-56-75583 and JP-A-57-39185).

The gas release coating layer on the surface of the ion exchange membrane not only improves the long-term stability of the current efficiency but also has an effect of further reducing the electrolysis voltage.
(Alkaline Chloride Electrolysis)

By use of the present ion exchange membrane as a diaphragm between an anode chamber and a cathode chamber in the electrolytic cell, alkaline chloride electrolysis can be carried out stably for a long period of time.

The electrolytic cell may be either a monopolar type or a bipolar type.

As a material constituting the anode chamber, a material which is resistant to an alkali chloride and chlorine. As the material, titanium is mentioned.

As the material constituting the cathode chamber, a material which is resistant to an alkali hydroxide and hydrogen is preferred. As such a material, stainless steel, nickel or the like is mentioned.

In a case where electrodes are disposed, the cathode may be disposed to be in contact with the ion exchange membrane or with a suitable distance to the ion exchange membrane.

The alkali chloride electrolysis can be carried out under known conditions. For example, while an aqueous sodium chloride solution or an aqueous potassium chloride solution is supplied to an anode chamber and water is supplied to the cathode chamber, operation is carried out at a temperature of from 50 to 120° C. at a current density of from 1 to 6 kA/m$^2$, whereby it is possible to produce an aqueous sodium hydroxide solution or an aqueous potassium hydroxide solution having a concentration of from 20 to 40 mass %.

The present ion exchange membrane explained as the above, contains the polymer N having units (U1), as the polymer having ionic groups, whereby the electrical resistance is low and the mechanical strength is sufficient as compared with an ion exchange membrane made of a conventional polymer.

EXAMPLES

Now, the present invention will be described in further detail with reference to Examples. However, it should be understood that the present invention is by no means restricted to such specific Examples.

Examples 1 to 8 are Preparation Examples, Examples 9 to 12, 15 and 16 are Examples of the present invention, and Examples 13, 14 and 17 are Comparative Examples.
(EW)

EW of the polymer F was determined by the following method. Here, the EW obtained by the following method is an EW at the time when the —SO$_2$F group is changed to the —SO$_3$H group.

Two precursor polymers (ones having EW of 1,000 g/equivalent and 909 g/equivalent) of which EW was preliminarily known by titration were prepared, and with respect to two films (thickness: 200 μm) made of the respective polymers, peak intensities based on sulfur atoms were measured by X-ray Fluorescence Spectrometer (RIX3000, manufactured by Rigaku Corporation) to prepare an calibration curve indicating the relation between the peak intensities and EW. The polymer F was pressed at a temperature of the TQ value described hereinafter to prepare a film with a thickness of 200 μm, and peak intensities based on sulfur atoms were measured by X-ray fluorescence spectrometer to determine EW from the above calibration curve.
(Molar Ratio of Repeating Units)

The molar ratio of the repeating units constituting the polymer F was determined by melt-state $^{19}$F-NMR.
(TQ Value)

The TQ value (unit: ° C.) indicates the molecular weight of a polymer and is a temperature at which the amount of a polymer extruded becomes 100 mm$^3$/sec when melt extrusion is carried out under an extrusion pressure of 2.94 MPa by using a nozzle with a length of 1 mm and an inner diameter of 1 mm.

The amount of the polymer F extruded was measured by changing the temperature by using a flow tester CFT-500A (manufactured by Shimadzu Corporation) and the TQ value at which the amount extruded became 100 mm$^3$/sec was determined.
(Water Content and AC Resistivity)

The water content and the AC resistivity of the film of the polymer N was obtained by the following method.

A 5 cm-square film of the polymer F was immersed in an aqueous solution containing 30 mass % of dimethylsulfoxide and 15 mass % of potassium hydroxide, at 80° C. for 16 hours, whereby the —SO$_2$F group in the film was hydrolyzed to be converted to a —SO$_3$K group. The film was washed with deionized water for 30 minutes, and then immersed in an aqueous 10 mass % sodium hydroxide solution at 40° C. for one hour to covert the —SO$_3$K group to a —SO$_3$Na group.

The film was immersed in an aqueous 12 mass % sodium hydroxide solution at 90° C. for 16 hours.

The film was put in a resistance-measurement cell having an effective area of 1.87 cm², then interposed between the two platinum black electrodes, an aqueous 12 mass % sodium hydroxide solution was calmly poured in the cell, and the cell was controlled to 25° C., and then it was left to stand for 30 minutes.

To a platinum terminal connected to the electrodes, a digital multimeter ZM2353 (manufactured by NF Corporation) was connected, and a 1,000 Hz AC current was applied thereto to measure the membrane resistance $R_M(\Omega)$ including a liquid resistance. The film was calmly taken out from the cell, as it is, and the liquid resistance $R_E(\Omega)$ was measured. An aqueous sodium hydroxide solution deposited on the surface of the film taken out was wiped out to measure the thickness t (cm) of the film.

The mass $W_1$ (g) of the film was measured at a room temperature, and the film was immersed in water of 90° C. for 16 hours, followed by vacuum drying at 130° C. for 16 hours. The mass $W_2$ (g) of the film after the drying was measured at a room temperature. The AC resistivity R ($\Omega$ cm) and the water content W (%) were obtained by the following formulae.

$$R=(R_M-R_E)\times 1.87/t$$

$$W=((W_1-W_2)/W_2)\times 100$$

(Initial Cell Voltage)

An electrolytic cell (height 15 cm, width 10 cm) with an effective conducting area of 1.5 dm² was used as an electrolytic cell, in which the inlet of water to be supplied was disposed at the lower portion of the cathode chamber and the outlet of an aqueous sodium hydroxide solution to be formed was disposed at the upper portion of the cathode chamber, and the inlet of a brine to be supplied was disposed at the lower portion of the anode chamber and the outlet of a diluted brine was disposed at the upper portion of the anode chamber. As an anode, one comprising punched metal (minor axis 4 mm, major axis 8 mm) covered with a solid solution of ruthenium oxide, iridium oxide and titanium oxide was used. As a cathode, SUS304 punched metal (minor axis 5 mm, major axis 10 mm) having ruthenium-containing Raney Nickel electrodeposited thereon was used.

The ion exchange membrane was put in an electrolytic cell, and the layer B was disposed so as to face the cathode. The electrolysis was carried out for one week under conditions at a temperature of 90° C. at a current density of 6 kA/m² while the cathode side was in a pressurized state so that the anode and the ion exchange membrane were in contact with each other, 290 g/L of an aqueous sodium chloride solution and water were supplied to the anode chamber and the cathode chamber, respectively, and the concentration of sodium chloride discharged from the anode chamber was kept at 200 g/L and the concentration of sodium hydroxide discharged from the cathode chamber was 32 mass %, thereafter the cell voltage was read out from the terminal connected to the electrodes.

(Strength at Break and Elongation at Break)

The ion exchange membrane was immersed in water, and the ion exchange membrane in a wet state was punched out into a form of No. 1 dumbbell, and then the strength at break and the elongation at break were measured at a tensile rate of 50 mm/min, by Universal Material Testing Instrument TENSILON RTC-1210A (manufactured by A&D Company, Limited).

Example 1

The compound (m12) was prepared by the following synthetic route.

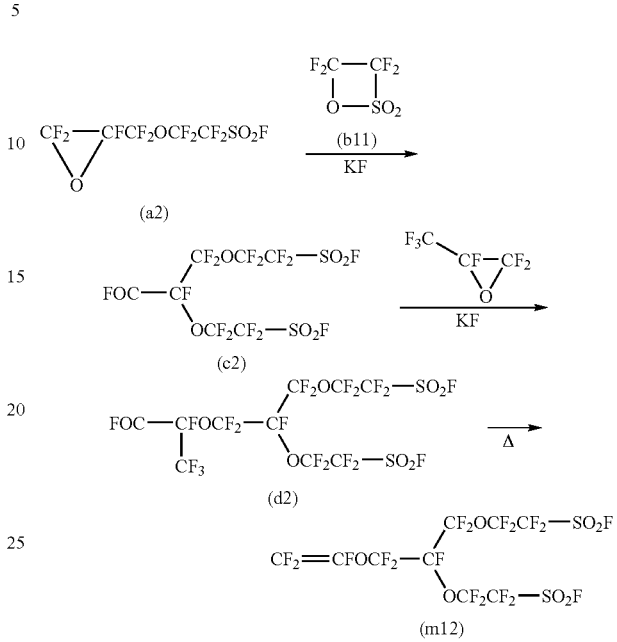

(i) Preparation of Compound (a2):

The compound (a2) was prepared in the same manner as in the method disclosed in Example 2 of JP-A-57-176973.

(ii) Preparation of Compound (c2):

To a 300 cm³ four-necked round bottom flask equipped with a Dimroth condenser, a thermometer, a dropping funnel and a glass rod with an agitating blade, 1.6 g of potassium fluoride (tradename: Chloro-Catch F, manufactured by MORITA CHEMICAL INDUSTRIES CO., LTD.) and 15.9 g of dimethoxyethane were put in a nitrogen atmosphere. Then, the round bottom flask was cooled in an ice bath, and 49.1 g of compound (b11) was added dropwise from the dropping funnel over a period of 32 minutes at an internal temperature of at most 10° C. After completion of the dropwise addition, 82.0 g of compound (a2) was added dropwise from the dropping funnel over a period of 15 minutes. Substantially no increase in the internal temperature was observed. After completion of the dropwise addition, the internal temperature was recovered to room temperature, followed by stirring for about 90 minutes. The lower layer was recovered by a separatory funnel. The recovered amount was 127.6 g, and the gas chromatography (hereinafter referred to as GC) purity was 55%. The recovered liquid was put in a 200 cm³ four-necked round bottom flask, followed by distillation to obtain 97.7 g of compound (c2) as a fraction at a degree of vacuum of from 1.0 to 1.1 kPa (absolute pressure). The GC purity was 98%, and the yield was 80%.

(iii) Preparation of Compound (d2):

To a 200 cm³ autoclave made of stainless steel, 1.1 g of potassium fluoride (tradename: Chloro-Catch F, manufactured by MORITA CHEMICAL INDUSTRIES CO., LTD.) was put. After deaeration, 5.3 g of dimethoxyethane, 5.3 g of acetonitrile and 95.8 g of the compound (c2) were put in the autoclave under reduced pressure.

Then, the autoclave was cooled in an ice bath, 27.2 g of hexafluoropropene oxide was added over a period of 27 minutes at an internal temperature of from 0 to 5° C., and the internal temperature was recovered to room temperature with stirring, followed by stirring overnight. The lower layer was recovered by a separatory funnel. The recovered amount was 121.9 g, and the GC purity was 63%. The recovered liquid was subjected to distillation to obtain 72.0 g of compound (d2) as a fraction at a boiling point of 80 to 84° C./0.67 to 0.80 kPa (absolute pressure). The GC purity was 98%, and the yield was 56%.

(iv) Preparation of Compound (m12):

Using a stainless steel tube with an inner diameter of 1.6 cm, a U-tube with a length of 40 cm was prepared. One end of the U-tube was filled with glass wool, and the other end was filled with glass beads with a stainless steel sintered metal as a perforated plate to prepare a fluidized bed type reactor. A nitrogen gas was used as a fluidizing gas so that raw materials could be continuously supplied by a metering pump. The outlet gas was collected using a trap tube with liquid nitrogen.

The fluidized bed type reactor was put in a salt bath, and 34.6 g of compound (d2) was supplied to the fluidized bed type reactor over a period of 1.5 hours so that the molar ratio of compound (d2)/$N_2$ would be 1/20 while the reaction temperature was maintained at 340° C. After completion of the reaction, 27 g of a liquid was obtained by the liquid nitrogen trap. The GC purity was 84%. The liquid was subjected to distillation to obtain compound (m12) as a fraction at a boiling point of 69° C./0.40 kPa (absolute pressure). The GC purity was 98%.

$^{19}$F-NMR (282.7 MHz, solvent: $CDCl_3$, standard: $CFCl_3$) of compound (m12).

δ(ppm): 45.5 (1F), 45.2 (1F), −79.5 (2F), −82.4 (4F), −84.1 (2F), −112.4 (2F), −112.6 (2F), −112.9 (dd, J=82.4 Hz, 67.1 Hz, 1F), −121.6 (dd, J=112.9 Hz, 82.4 Hz, 1F), −136.0 (ddt, J=112.9 Hz, 67.1 Hz, 6.1 Hz, 1F), −144.9 (1F).

Example 2

Preparation of Polymer F1

The interior of an autoclave (internal capacity: 21,100 cm³, made of stainless steel) was replaced with nitrogen, followed by sufficient deaeration. Under reduced pressure, 6,665 g of compound (m12), 5,730 g of compound (5-1) and 154.4 mg g of methanol as a solvent, and 5.595 g of azobisisobutyronitrile (hereinafter, referred to as "AIBN") as a radical initiator were charged, and the autoclave was deaerated to the vapor pressure:

$$CClF_2CF_2CHClF \quad (5\text{-}1).$$

The internal temperature was raised to 70° C., TFE was introduced to the autoclave, and the pressure was adjusted at 0.87 MPaG (gauge pressure). Polymerization was carried out for 11.5 hours while the temperature and the pressure were maintained constant. Then, the autoclave was cooled to terminate the polymerization, and the gas in the system was purged.

The reaction liquid was diluted with the compound (5-1), and the compound (5-2) was added to coagulate the polymer, followed by filtration:

$$CH_3CCl_2F \quad (5\text{-}2).$$

The polymer was stirred in the compound (5-1), and the compound (5-2) was added thereto to re-coagulate the polymer, followed by filtration. Such recoagulation was repeated twice. The polymer was dried under reduced pressure at 90° C. overnight, to obtain the polymer F1 which is a copolymer of TFE and compound (m12). The yield, EW, the ratio of repeating units constituting the polymer and the TQ value are shown in Table 1.

Example 3

Preparation of Polymer F2

Polymer F2 which is a copolymer of TFE and the compound (m12) was obtained in the same manner as in Example 2 except that the conditions were changed as identified in Table 1. The yield, EW, the ratio of repeating units constituting the polymer and the TQ value are shown in Table 1.

TABLE 1

| | Ex. 2 | Ex. 3 |
|---|---|---|
| Obtained precursor polymer | F1 | F2 |
| Autoclave (cm³) | 21100 | 1006 |
| Compound (m12) (g) | 6665 | 492.8 |
| Compound (2-1) (g) | 5730 | 76.0 |
| Type of radical initiator | AIBN | AIBN |
| Radical initiator (mg) | 5595 | 57.5 |
| Polymerization temperature (° C.) | 70 | 65 |
| Pressure (MPaG) | 0.87 | 1.15 |
| Polymerization time (hrs) | 11.5 | 10.4 |
| Yield (g) | 2259 | 94.1 |
| EW (g/equivalent) | 725 | 621 |
| Units (TFE) (mol %) | 89.2 | 86.0 |
| Units (M12) (mol %) | 10.8 | 14.0 |
| TQ (° C.) | 245 | 248 |

Example 4

Preparation of Polymer F

The interior of an autoclave (internal capacity: 125 cm³, made of stainless steel) was replaced with nitrogen, followed by sufficient deaeration. Under reduced pressure, 63.40 g of the compound (m12), 10.94 g of the compound (m22), 12.21 g of the compound (5-1) as a solvent and 39.7 mg of AIBN were charged, and the autoclave was freeze-deaerated with liquid nitrogen twice to carry out the deaeration sufficiently.

The internal temperature was raised to 65° C., TFE was introduced to the autoclave, and the pressure was adjusted at 1.24 MPaG (gauge pressure). Polymerization was carried out for 4.0 hours while the temperature and the pressure were maintained constant. Then, the autoclave was cooled to terminate the polymerization, and the gas in the system was purged.

The reaction liquid was diluted with compound (5-1), and the compound (5-2) was added to coagulate the polymer, followed by filtration.

The polymer was stirred in the compound (5-1), and the compound (5-2) was added thereto to re-coagulate the polymer, followed by filtration. Such re-coagulation was repeated twice. The polymer was dried under reduced pressure at 95° C. overnight to obtain the polymer F3 which is a copolymer of TFE, the compound (m12) and the compound (m22). The yield, EW, the ratio of repeating units constituting the polymer and the TQ value are shown in Table 2.

Example 5

Preparation of Polymer F4

The interior of an autoclave (internal capacity: 230 cm³, made of stainless steel) was replaced with nitrogen, followed by sufficient deaeration. Under reduced pressure, 81.62 g of the compound (m12), 58.40 g of the compound (m31), 25.12 g of the compound (5-1) as a solvent and 99.3 mg of AIBN were charged therein, and the autoclave was freeze-deaerated with liquid nitrogen twice to carry out the deaeration sufficiently.

The internal temperature was raised to 65° C., TFE was introduced to the autoclave, and the pressure was adjusted at 1.18 MPaG (gauge pressure). While the temperature and the pressure were maintained constant, polymerization was carried out for 7.0 hours. Then, the autoclave was cooled to terminate the polymerization, and the gas in the system was purged.

The reaction liquid was diluted with the compound (5-1), and the compound (5-2) was added to coagulate the polymer, followed by filtration.

The polymer was stirred in the compound (5-1), and the compound (5-2) was added to recoagulate the polymer, followed by filtration. Such re-coagulation was repeated twice. The polymer was dried under reduced pressure at 80° C. overnight to obtain the polymer F4 which is a copolymer of TFE, the compound (m12) and the compound (m31). The yield, EW, the ratio of repeating units constituting the polymer and the TQ value are shown in Table 2.

TABLE 2

|  | Ex. 4 | Ex. 5 |
|---|---|---|
| Obtained precursor polymer | F3 | F4 |
| Autoclave (cm³) | 125 | 230 |
| Compound (m12) (g) | 63.40 | 81.62 |
| Compound (m22) (g) | 10.94 | 0 |
| Compound (m31) (g) | 0 | 58.40 |
| Compound (2-1) (g) | 12.21 | 25.12 |
| Type of radical initiator | AIBN | AIBN |
| Radical initiator (mg) | 39.7 | 99.3 |
| Polymerization temperature (° C.) | 65 | 65 |
| Pressure (MPaG) | 1.24 | 1.18 |
| Polymerization time (hrs) | 4.0 | 7.0 |
| Yield (g) | 9.34 | 26.95 |
| EW (g/equivalent) | 787 | 741 |
| Units (TFE) (mol %) | 87.0 | 84.8 |
| Units (M12) (mol %) | 10.4 | 7.6 |
| Units (M22) (mol %) | 2.6 | 0 |
| Units (M31) (mol %) | 0 | 7.6 |
| TQ (° C.) | 259 | 259 |

Examples 6 and 7

Preparation of Polymers F5 and F6

TFE and the compound (m31) were copolymerized to obtain the polymer F5 and the polymer F6. EW, the ratio of repeating units constituting the polymer and the TQ value are shown in Table 3.

TABLE 3

|  | Ex. 6 | Ex. 7 |
|---|---|---|
| Obtained precursor polymer | F5 | F6 |
| EW (g/equivalent) | 909 | 741 |
| Units (TFE) (mol %) | 82.2 | 74.4 |
| Units (M12) (mol %) | 0 | 0 |
| Units (M22) (mol %) | 0 | 0 |
| Units (M31) (mol %) | 17.8 | 25.3 |
| TQ (° C.) | 220 | 231 |

Example 8

Preparation of Polymer G1

TFE and the compound (3-41) were copolymerized to obtain the polymer G1. EW was 1,050 g/equivalent.

$$CF_2=CFOCF_2CF_2CF_2COOCH_3 \quad (3\text{-}41).$$

Example 9

Production of Film of Polymer N1

By using the polymer F1, a film of the sodium salt form polymer N1 was obtained by the following method.

First, the polymer F1 was formed into a film with a thickness of from 100 to 150 μm by press molding at the TQ temperature of polymer F1.

Then, the above film was immersed in an aqueous solution containing 30 mass % of dimethylsulfoxide and 15 mass % of potassium hydroxide at 90° C. for 1 hour to hydrolyze —SO₂F groups in the film thereby to convert these groups to —SO₃K groups.

Then, the film was washed with a deionized water for 30 minutes, then immersed in a 10 mass % aqueous sodium hydroxide solution at 40° C. for 1 hour to convert the —SO₂F group to —SO₃Na group, whereby a film of the sodium salt form polymer N1 was obtained.

The water content and the AC resistivity of the polymer N1 were measured. The results are shown in Table 4.

Examples 10 to 14

Production of Films of Polymers N2 to N6

Films of sodium salt form polymers N2 to N6 were obtained in the same manner as in Example 9 except that polymers F2 to F6 were used instead of the polymer F1.

The water content and the AC resistivity of the films of the polymers N2 to N6 were measured. The results are shown in Table 4.

TABLE 4

|  | Ex. 9 | Ex. 10 | Ex. 11 | Ex. 12 | Ex. 13 | Ex. 14 |
|---|---|---|---|---|---|---|
| Precursor polymer used | F1 | F2 | F3 | F4 | F5 | F6 |
| Obtained sodium salt form polymer | N1 | N2 | N3 | N4 | N5 | N6 |
| Water content (%) | 25.6 | 49.5 | 32.3 | 34.5 | 27.3 | 51.8 |
| AC resistivity (Ω · cm) | 28.3 | 10.8 | 18.8 | 20.8 | 30.9 | 12.7 |

Production of ion exchange membrane R1:

On a mold-release polyethylene terephthalate (hereinafter referred to as "PET") film, the polymer F1 and the polymer G1 were coextruded so that a layer of the polymer G1 was on the mold-release PET film side, whereby a two-layer structure laminate X made of a 65 μm-thick layer made of the polymer F1 and a 20 μm-thick layer of the polymer G1 was obtained.

Separately, the polymer F1 was melt-extruded on the mold-release PET film to obtain a 30 μm-thick film Y.

A monofilament PTFE thread obtained by quick orientation of a PTFE film and slitting it into a size of 100 denier, and a multifilament PET thread obtained by twisting six 5 denier PET fibers, were plain-waved in alternate arrangement at a rate of two PET thread per one PTFE thread to obtain a woven fabric (reinforcing material) with a thread density of 30 threads/cm. This woven fabric was flattened by using a roll pressing machine to be a woven fabric thickness of about 80 μm.

The laminate X, the film Y and the woven fabric were overlaid so as to be mold-release PET/film Y/woven fabric/laminate X/mold-release PET, and heated and laminated by using a roll press machine. Then, the mold-release PET film was peeled off to obtain a reinforced laminate Z.

A paste comprising 29.0 mass % of zirconium oxide having an average particle size of 1 μm, 1.3 mass % of methylcellulose, 4.6 mass % of cyclohexanol, 1.5 mass % of cyclohexane and 63.6 mass % of water was transferred by roll pressing to the film Y side of the laminate Z to attach a gas release coating layer. The amount of zirconium oxide attached was 20 g/m².

The laminate Z was immersed in an aqueous solution containing 30 mass % of dimethylsulfoxide and 15 mass % of potassium hydroxide at 95° C. for 30 minutes so as to hydrolyze —COOCH₃ groups and —SO₂F groups and convert them to ionic groups, whereby a laminate having a layer constitution of mass release coating layer/layer A/woven fabric/layer A/layer B was obtained.

A dispersion liquid having 13 mass % of zirconium oxide having an average particle size of 5 μm dispersed in an ethanol solution containing 2.5 mass % of an acid form polymer N5 which is obtained by converting the polymer F5 to an acid form, was prepared. Such a dispersion liquid was spread on the layer B side of the laminate to attach a gas release coating layer, whereby a laminate having a layer constitution of gas release coating layer/layer A/woven fabric/layer A/layer B/gas release coating layer. The amount of zirconium oxide attached was 10 g/m².

The laminate was immersed in a 4 mass % aqueous sodium hydrogen carbonate solution at 40° C. for 16 hours to convert the ionic groups from potassium salt form to sodium salt form, whereby the ion exchange membrane R1 was obtained.

The strength at break and the elongation at break of the ion exchange membrane R1 were measured. Further, the ion exchange membrane R1 was mounted in the electrolytic cell to measure the initial cell voltage. The results are shown in Table 5.

Examples 16 and 17

Production of Ion Exchange Membranes R2 and R3

The ion exchange membranes R2 and R3 were obtained in the same manner as in Example 15 except that polymers F3 and F5 were used instead of the polymer F1.

The strength at break and the elongation at break of the ion exchange membranes R2 and R3. Further, the ion exchange membranes R2 and R3 were mounted in an electrolytic cell to measure the initial cell voltage. The results are shown in Table 5.

TABLE 5

|  | Ex. 15 | Ex. 16 | Ex. 17 |
|---|---|---|---|
| Ion exchange membrane | R1 | R2 | R3 |
| Precursor polymer used | F1 | F3 | F5 |
| Initial cell voltage (V) | 3.13 | 3.09 | 3.15 |
| Strength at break (N/cm) | 4.8 | 4.6 | 4.5 |
| Elongation at break (%) | 30 | 28 | 25 |

INDUSTRIAL APPLICABILITY

By using the ion exchange membrane for alkaline chloride electrolysis of the present invention, it is possible to carry out alkaline chloride electrolysis (salt electrolysis) at a low electrolysis voltage.

The entire disclosure of Japanese Patent Application No. 2007-020936 filed on Jan. 31, 2007 including specification, claims and summary is incorporated herein by reference in its entirety.

What is claimed is:

1. An ion exchange membrane for alkaline chloride electrolysis, comprising:
a laminate comprising at least two polymer layers;
wherein
one layer comprises a polymer having carboxylic acid groups; and
a second layer comprises a polymer having ionic groups, wherein the ionic groups are of formula (U1):

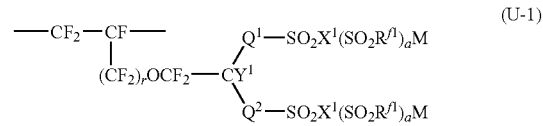

wherein
$Q^1$ is a perfluoroalkylene group which may have an etheric oxygen atom,
$Q^2$ is a single bond or a perfluoroalkylene group which may have an etheric oxygen atom,
$R^{f1}$ is a perfluoroalkyl group which may have an etheric oxygen atom,
$X^1$ is an oxygen atom, a nitrogen atom or a carbon atom,
a is 0 when $X^1$ is an oxygen atom, 1 when $X^1$ is a nitrogen atom, or 2 when $X^1$ is a carbon atom,
$Y^1$ is a fluorine atom or a monovalent perfluoroorganic group,
r is 0 or 1, and
M is a hydrogen atom or an alkali metal.

2. The ion exchange membrane for alkaline chloride electrolysis according to claim 1, wherein the repeating units of the formula (U1) are repeating units of formula (M1):

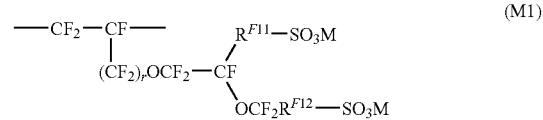

wherein $R^{f11}$ is a single bond or a $C_{1-6}$ linear perfluoroalkylene group which may have an etheric oxygen atom, and $R^{f12}$ is a $C_{1-6}$ linear perfluoroalkylene group.

3. The ion exchange membrane for alkaline chloride electrolysis according to claim 1, wherein the polymer having ionic groups further comprises repeating units based on tetrafluoroethylene.

4. The ion exchange membrane for alkaline chloride electrolysis according to claim 1, wherein the polymer having ionic groups further comprises repeating units of formula (U2) or repeating units of formula (U3):

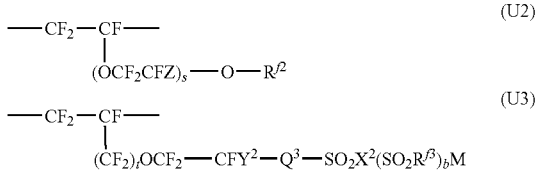

(U2)

(U3)

wherein $R^{f2}$ is a perfluoroalkyl group,

Z is a fluorine atom or a monovalent perfluoroorganic group, is an integer of from 0 to 3, $Q^3$ is a single bond or a perfluoroalkylene group which may have an etheric oxygen atom, $R^{f3}$ is a perfluoroalkyl group, $X^2$ is an oxygen atom, a nitrogen atom or a carbon atom, b is 0 when $X^2$ is an oxygen atom, 1 when $X^2$ is a nitrogen atom, or 2 when $X^2$ is a carbon atom, $Y^2$ is a fluorine atom or a monovalent perfluoroorganic group, t is 0 or 1, and M is a hydrogen atom or an alkali metal.

5. The ion exchange membrane for alkaline chloride electrolysis according to claim 4, wherein the repeating units the formula (U2) are repeating units represented by formula (M2):

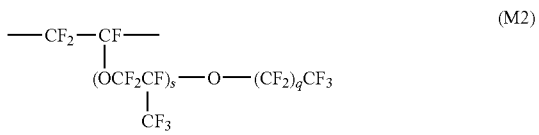

(M2)

wherein q is an integer of from 1 to 12.

6. The ion exchange membrane for alkaline chloride electrolysis according to claim 1, wherein an equivalent weight of the polymer having ionic groups is from 600 to 1,100 g/equivalent when M is a hydrogen atom.

7. The ion exchange membrane for alkaline chloride electrolysis according to claim 1, wherein a mass average molecular weight of the polymer having ionic groups is from $1 \times 10^4$ to $1 \times 10^7$.

8. The ion exchange membrane for alkaline chloride electrolysis according to claim 1, wherein the polymer having carboxylic acid groups is a copolymer of at least one compound of formula (2) and at least one compound of formula (3) or (4), and precursor groups for the carboxylic acid groups in the copolymer are converted to the carboxylic acid groups:

$$CF_2{=}CX^{21}X^{22} \qquad (2)$$

$$CF_2{=}CF(OCF_2CFX^{31})_v O(CF_2)_w\text{-}A \qquad (3)$$

$$CF_2{=}CFO(CF_2)_x O(CF_2)_y\text{-}A \qquad (4)$$

wherein each of $X^{21}$ and $X^{22}$ is a fluorine atom, a chlorine atom, a hydrogen atom or a trifluoromethyl group, $X^{31}$ is a fluorine atom or a trifluoromethyl group, v is an integer of from 1 to 3, w is an integer of from 0 to 2, A is a precursor group to be converted to a carboxylic acid group (—COOM) by hydrolysis in an aqueous alkaline solution, M is a hydrogen atom or an alkali metal, and x+y is an integer of from 4 to 6.

9. The ion exchange membrane for alkaline chloride electrolysis according to claim 1, wherein a thickness of the layer comprising the polymer having carboxylic acid groups is from 20 to 200 μm.

10. The ion exchange membrane for alkaline chloride electrolysis according to claim 9, wherein the thickness of the carboxylic acid polymer layer is from 10 μm to 50 μm.

11. The ion exchange membrane for alkaline chloride electrolysis according to claim 1, which further comprises a reinforcing material laminated thereon.

* * * * *